(12) United States Patent
Cui (10) Patent No.: US 7,741,378 B2
(45) Date of Patent: Jun. 22, 2010

(54) POROUS MONODISPERSED PARTICLES AND METHOD FOR PRODUCTION THEREOF, AND USE THEREOF

(75) Inventor: Ying Cui, Sayama (JP)

(73) Assignee: Soken Chemical & Engineering Co., Ltd., Tokyo (JP)

( * ) Notice: Subject to any disclaimer, the term of this patent is extended or adjusted under 35 U.S.C. 154(b) by 284 days.

(21) Appl. No.: 11/817,412

(22) PCT Filed: Mar. 1, 2006

(86) PCT No.: PCT/JP2006/030846

§ 371 (c)(1),
(2), (4) Date: Aug. 30, 2007

(87) PCT Pub. No.: WO2006/093179

PCT Pub. Date: Sep. 8, 2006

(65) Prior Publication Data

US 2009/0036559 A1 Feb. 5, 2009

(30) Foreign Application Priority Data

Mar. 1, 2005 (JP) ............................. 2005-055959
Mar. 1, 2005 (JP) ............................. 2005-055960

(51) Int. Cl.
*C08J 9/18* (2006.01)
*C08J 9/16* (2006.01)
*C08F 110/00* (2006.01)
*C08F 36/00* (2006.01)

(52) U.S. Cl. ........................... 521/60; 521/59; 521/142; 521/143; 521/149; 521/150

(58) Field of Classification Search .................. 521/60, 521/59, 142, 143, 149, 150
See application file for complete search history.

(56) References Cited

U.S. PATENT DOCUMENTS

| 3,753,932 A * | 8/1973 | Jenkins ......................... 521/61 |
| 2006/0087718 A1 * | 4/2006 | Takagi et al. ................. 359/296 |
| 2007/0141306 A1 * | 6/2007 | Kasai et al. .................. 428/143 |

FOREIGN PATENT DOCUMENTS

| JP | 61 225254 | 10/1986 |
| JP | 5 222109 | 8/1993 |
| JP | 08-134115 | * 5/1996 |

(Continued)

*Primary Examiner*—Randy Gulakowski
*Assistant Examiner*—Kara Negrelli
(74) *Attorney, Agent, or Firm*—Oblon, Spivak, McClelland, Maier & Neustadt, L.L.P.

(57) ABSTRACT

To provide porous monodispersed particles obtained by preparing, as seed particles, poly(methyl methacrylate) particles or acrylic resin particles comprising 70% by mass or more of methyl methacrylate as a copolymerization component, swelling the seed particles 20 to 80 times the size of the original seed particles by mass using a swelling solution comprising an oil-soluble polymerization initiator and a monomer mixture containing 70% by mass or more of methyl methacrylate and 3 to 8% by mass of divinylbenzene, and polymerizing the monomers. The particles are porous particles with a diameter of the order of micrometers and a narrow particle-size distribution and are monodispersed. Colored monodispersed particles obtained by agglomerating a pigment in the porous monodispersed particles are monodispersed and spherical, and contain a large amount of pigment therein.

14 Claims, 3 Drawing Sheets

FOREIGN PATENT DOCUMENTS

| | | | |
|---|---|---|---|
| JP | 8 134115 | | 5/1996 |
| JP | 08134115 A | * | 5/1996 |
| JP | 8 169907 | | 7/1996 |
| JP | 08-169907 | * | 7/1996 |
| JP | 08169907 A | * | 7/1996 |
| JP | 11-100407 | * | 4/1999 |
| JP | 11 100407 | | 4/1999 |
| JP | 11100407 A | * | 4/1999 |
| JP | 2000-191818 | * | 7/2000 |
| JP | 2000 191818 | | 7/2000 |
| JP | 2000191818 A | * | 7/2000 |
| JP | 2002-363205 | * | 12/2002 |
| JP | 2002 363205 | | 12/2002 |
| JP | 2002363205 A | * | 12/2002 |
| JP | 2004 004506 | | 1/2004 |
| JP | 2004 226449 | | 8/2004 |
| JP | 2004 271816 | | 9/2004 |

* cited by examiner

POROUS MONODISPERSED PARTICLES AND METHOD FOR PRODUCTION THEREOF, AND USE THEREOF

This application is a 371 of PCT/JP2006/303846, filed Mar. 1, 2006.

TECHNICAL FIELD

The present invention relates to porous monodispersed particles, a method for producing the same, and uses of the same. More particularly, the invention relates to porous monodispersed particles which are virtually spherical, have a large surface area, and have a uniform particle diameter, to a method for producing the same, and to colored monodispersed particles obtained by agglomerating a pigment in the porous monodispersed particles and a method for producing the same.

BACKGROUND ART

Methods which utilize phase separation by emulsion polymerization have heretofore been known to produce particles in the order of submicrometers having various shapes such as DARUMA-shaped (potbellied particles), IIDAKO-shaped (*octopus ocellatus*-shaped particles), KONPEITO-shaped (a Japanese confectionery with wart-like protrusions over the surface-shaped particles), hollow particles, and other irregularly shaped particles (see Non-Patent Document 1).

On the other hand, as a method for producing porous particles with pores in the order of micrometers, a method comprising causing polymer seed particles to absorb a cross-linking monomer and an initiator, and polymerizing the monomers (see Patent Document 1), and a method comprising adding a mixture of cross-linking monomers to polymer particles, and polymerizing the monomers by heating them rapidly to the decomposition temperature of the initiator in the presence of an oil-soluble initiator (see Patent Document 2) have been known.

Known porous particles with a particle diameter in the order of micrometers, however, have low porosity and a wide particle-size distribution and are not monodispersed, and therefore have not been practical.

Thus, porous particles which have high porosity and a narrow distribution have been required for use as a carrier for pigments or pharmaceutical agents, or for use as various types of adsorbents, analytical columns, and the like.

Moreover, colored resin particles produced by staining resin particles with a dye have problems of poor color developing stability and the like. A method of coloring resin particles with a pigment has been regarded as a preferable method for overcoming such a problem.

Among the methods for coloring resin particles with a pigment, Patent Document 3 reported a method of preparing a pigment-containing monomer by suspension polymerization, and Patent Documents 4 and 5 proposed polymerized toners. The colored resin particles obtained by these methods, however, had a wide particle-size distribution, and were not monodispersed.

Moreover, Patent Document 1 reported a method comprising preparing porous particles as resin particles, and adding a pigment to the porous particles. The pigment, however, was not easily agglomerated in the porous particles obtained by this method, and the amount of pigment contained therein was small.

Patent Document 1: JP 2000-191818 A

Patent Document 2: JP 1986-225254 A

Patent Document 3: JP 2004-4506 A

Patent Document 4: JP 2004-271816 A

Patent Document 5: JP 2004-226449 A

Non-Patent Document 1: M. Okubo et. al., Colloid Polym. Sci., 274:433-438 (1996)

DISCLOSURE OF THE INVENTION

Problems to be Solved by the Invention

The present invention was accomplished in view of the foregoing conditions. A first object of the invention is to provide monodispersed porous particles with a diameter of the order of micrometers and a narrow particle-size distribution. A second object of the invention is to provide monodispersed, spherical, and colored particles with a large pigment content obtained by agglomerating a pigment in the porous particles.

Means for Solving the Problems

The present inventors have conducted extensive research to overcome the aforementioned problems. As a result, the inventors have found that porous monodispersed particles which have a particle diameter in the order of micrometers and a narrow particle-size distribution can be obtained by preparing acrylic resin particles comprising a specific amount of methyl methacrylate as seed particles, swelling the seed particles with a swelling solution comprising a mixture of monomers and a polymerization initiator, and polymerizing the monomers. Moreover, the inventors have found that colored monodispersed particles with excellent properties can be obtained by agglomerating a pigment in the porous monodispersed particles prepared as above. The present invention was accomplished based on these findings.

The invention thus provides porous monodispersed particles obtained by preparing, as seed particles, poly(methyl methacrylate) particles or acrylic resin particles comprising 70% by mass or more of methyl methacrylate as a copolymerization component, swelling the seed particles 20 to 80 times the size of the original seed particles by mass using a swelling solution comprising an oil-soluble polymerization initiator and a monomer mixture containing 70% by mass or more of methyl methacrylate and 3 to 8% by mass of divinylbenzene, and polymerizing the monomers.

Moreover, the invention provides a method for producing porous monodispersed particles which comprises preparing, as seed particles, poly(methyl methacrylate) particles or acrylic resin particles comprising 70% by mass or more of methyl methacrylate as a copolymerization component, swelling the seed particles 20 to 80 times the size of the original seed particles by mass using a swelling solution comprising an oil-soluble polymerization initiator and a monomer mixture containing 70% by mass or more of methyl methacrylate and 3 to 8% by mass of divinylbenzene, and polymerizing the monomers.

In addition, the invention provides colored monodispersed particles obtained by agglomerating a pigment in porous monodispersed particles produced by preparing, as seed particles, poly(methyl methacrylate) particles or acrylic resin particles comprising 70% by mass or more of methyl methacrylate as a copolymerization component, swelling the seed particles 20 to 80 times the size of the original seed particles by mass using a swelling solution comprising an oil-soluble polymerization initiator and a monomer mixture containing 70% by mass or more of methyl methacrylate and 3 to 8% by mass of divinylbenzene, and polymerizing the monomers.

Furthermore, the invention provides a method for producing colored monodispersed particles which comprises preparing, as seed particles, poly(methyl methacrylate) particles or acrylic resin particles comprising 70% by mass or more of methyl methacrylate as a copolymerization component, swelling the seed particles 20 to 80 times the size of the original seed particles by mass using a swelling solution comprising an oil-soluble polymerization initiator and a monomer mixture containing 70% by mass or more of methyl methacrylate and 3 to 8% by mass of divinylbenzene, polymerizing the monomers, and agglomerating a pigment in the resulting porous monodispersed particles.

EFFECT OF THE INVENTION

The porous monodispersed particles according to the invention are not only spherical and porous, but also have a narrow particle-size distribution and are monodispersed.

Therefore, the porous monodispersed particles are usable as a carrier that can incorporate a variety of pigments, pharmaceutical agents, and the like, and are also suitable for use as various types of adsorbents, columns, and the like, because of their porosity.

Moreover, the colored monodispersed particles according to the invention are monodispersed and spherical, while containing a large amount of pigment.

The colored monodispersed particles are thus usable as a display element of electronic paper, a spacer for liquid crystal display panels, a toner for printers, a cosmetic product, and the like.

BEST MODE FOR CARRYING OUT THE INVENTION

The seed particles for use in preparing the porous monodispersed particles of the invention (hereinafter also simply referred to as "seed particles") are poly(methyl methacrylate) particles or acrylic resin particles comprising methyl methacrylate as a copolymerization component in an amount of 70% by mass (hereinafter simply indicated by "%") or more, preferably 80% or more, and more preferably 90% or more. The seed particles can be prepared by a common method, for example, by swelling base particles with a small particle diameter such as poly(methyl methacrylate) particles using a swelling monomer such as methyl methacrylate, and then polymerizing the monomers. The swelling and polymerization may be performed more than once. Alternatively, the seed particles can be directly prepared by other polymerization processes than that described above such as resultant emulsion polymerization, soap-free polymerization, or dispersion polymerization. The swelling monomer for use in preparing the seed particles may include other copolymerization components than the methyl methacrylate. Examples of such components include alkyl(meth)acrylates such as methyl acrylate, ethyl(meth)acrylate, propyl(meth)acrylate, isopropyl (meth)acrylate, butyl(meth)acrylate, isobutyl (meth)acrylate, tertiary-butyl (meth)acrylate, 2-ethylhexyl (meth)acrylate, isooctyl(meth)acrylate, and lauryl (meth) acrylate; styrene; and the like. Note that the inclusion of 30% or more of other alkyl(meth)acrylates than methyl methacrylate and 5% or more of styrene in the seed particles is not preferable, because porous monodispersed particles may not be obtained.

The seed particles are preferably spherical. The average particle diameter of the seed particles is preferably from 0.5 to 4.5 µm, and more preferably 1.3 to 3.5 µm. While the weight average molecular weight of the seed particles is not particularly limited, it is preferably from 150,000 to 300,000 and particularly preferably 180,000 to 270,000. If the weight average molecular weight is less than 150,000, the particles may not easily become porous, whereas if the weight average molecular weight is more than 300,000, pore apertures may mostly form in one region of the particles, resulting in particles with a distorted shape. The weight average molecular weight is herein a polystyrene reduced weight average molecular weight measured by gel permeation chromatography (GPC).

In preparing the porous monodispersed particles of the invention, it is necessary that the seed particles be swollen with a swelling solution comprising an oil-soluble polymerization initiator and a monomer mixture containing 70% by mass or more of methyl methacrylate and 3 to 8% by mass of divinylbenzene.

The monomer mixture contained in the swelling solution contains methyl methacrylate in an amount of 70% or more, preferably 80% or more, and more preferably 90% or more. The monomer mixture also contains divinylbenzene in an amount of 3 to 8%, and preferably 3 to 6%. The divinylbenzene used acts as a cross-linking agent. The use of divinylbenzene in an amount of less than 3% is not preferable, because the particles may not become porous, whereas the use thereof in an amount of more than 8% is not also preferable, because the apertures of the pores of the porous particles may be concentrated in one region.

As in the case of preparing the seed particles, the monomer mixture may contain monomers other than methyl methacrylate. Examples of such other monomers include alkyl(meth) acrylates, such as methyl acrylate, ethyl(meth)acrylate, propyl (meth)acrylate, isopropyl(meth)acrylate, butyl(meth) acrylate, isobutyl(meth)acrylate, tertiary-butyl(meth) acrylate, 2-ethylhexyl(meth)acrylate, isooctyl(meth) acrylate, and lauryl(meth)acrylate; styrene; and the like. The content of alkyl(meth)acrylates other than methyl methacrylate in the monomer mixture is 27% or less, preferably 17% or less, and more preferably 7% or less. The inclusion of these monomers in an amount that exceeds 27% is not preferable, because the particles may not become porous. Moreover, the inclusion of styrene in an amount of 5% or more is not preferable, because porous monodispersed particles may not be obtained.

Examples of the oil-soluble polymerization initiator contained in the swelling solution include a peroxide polymerization initiator, such as benzoyl peroxide, lauroyl peroxide, di-t-butyl peroxide, and cumene hydroperoxide, and azo polymerization initiators such as azobisisobutyronitrile. The amount of the oil-soluble polymerization initiator is about 0.2 to 4 parts by weight, and preferably about 1 to 2 parts by weight, per 100 parts by weight of the monomer mixture.

In order to swell the seed particles with the swelling solution, swelling is preferably performed at a certain temperature for a certain period of time. The temperature is preferably in the range of room temperature to 50° C., and the time is preferably in the range of 0.5 to 3 hours. The seed particles are preferably swollen about 20 to 80 times the original size thereof by mass, using the swelling solution.

The swelling solution is preferably mixed with water and an emulsifier, such as sodium dodecylbenzenesulfonate, to previously emulsify using a homogenizer or the like. The swelling solution may also be mixed with, for example, a polymerization inhibitor, such as sodium nitrite or hydroquinone.

The seed particles thus swollen with the swelling solution are then subjected to a polymerization reaction. The polymerization reaction can be carried out by a common method such as seed polymerization. The polymerization reaction can also be carried out under the conditions of a common method.

During polymerization, a dispersion stabilizer such as polyvinyl alcohol, polyoxyethylene polycyclic phenyl ether sulfate, or hydroxypropylcellulose may be added to the reaction system.

Further, subsequent to polymerization, purification may be carried out by, for example, washing with water or an aqueous solution of an alcohol such as methyl alcohol, ethyl alcohol, or isopropyl alcohol, or by filtration.

The porous monodispersed particles thus obtained are porous, virtually spherical, and have pores that are present not only near the surface but also penetrate through the inside of the particles. Moreover, the porous monodispersed particles have a narrow particle-size distribution and are monodispersed. More specifically, the average particle diameter of the porous monodispersed particles is from about 2 to 15 μm, and preferably from about 5 to 10 μm. The CV value indicating the dispersion (variation) of the particle diameter is typically less than 15%, and preferably less than 10%. Further, the specific surface area is from about 0.7 to 10 m$^2$/g. This resultant specific surface area of the porous monodispersed particles is about 2 to 10 times as large as the specific surface area of perfectly spherical particles with about an equal particle diameter. Although the surface charge on the porous monodispersed particles is negative, the surface can also be positively charged by, for example, adding (introducing) a monomer with a functional group such as an amide group or an amino group, by a common method.

Due to the properties described above, the porous monodispersed particles of the invention obtained in the manner mentioned above can be used as, for example, a carrier for various functional materials such as pigments and pharmaceutical agents, a filler for chromatography, and an adsorbent of various types.

Among these uses, the porous monodispersed particles of the invention are preferably used, in particular, as colored monodispersed particles in which a pigment is agglomerated.

Such colored monodispersed particles are produced by agglomerating a pigment in the porous monodispersed particles described above. The pigment for use in agglomeration is preferably one or more pigments selected from the group consisting of anionic pigments, cationic pigments, and nonionic pigments.

Among these pigments, examples of anionic pigments include black pigments such as Bonjet Black CW1 (manufactured by Orient Chemical Industries, Ltd.), white pigments such as SA White 14663 (manufactured by Mikuni Color, Ltd.) and SA White 14664 (manufactured by Mikuni Color, Ltd.) and yellow pigments such as SA Yellow-NF-117 (manufactured by Mikuni Color, Ltd.). Examples of cationic pigments include black pigments such as Plus Black C (manufactured by Mikuni Color, Ltd.). Examples of nonionic pigments include black pigments such as PSM-Black C (manufactured by Mikuni Color, Ltd.).

The pigment may be agglomerated in the porous monodispersed particles by preparing a dispersion of the porous monodispersed particles and the pigment in water or the like by a common method, and stirring the dispersion. The agglomeration is preferably performed by stirring the dispersion while heating to a temperature as high as possible but lower than the boiling point of water or the like, for about 0.5 to 3 hours. The agglomeration may also be performed more than once by replacing the pigment, so as to achieve incorporation of a desired amount of pigment.

One method for increasing the amount of pigment incorporated in the porous monodispersed particles comprises agglomerating a pigment with a relatively small particle diameter in the porous monodispersed particles (primary agglomeration), and agglomerating a pigment with a particle diameter relatively greater than that of the pigment used in the primary agglomeration (secondary agglomeration). The pigment for use in the primary agglomeration has an average particle diameter of less than 0.2 μm, and preferably 0.15 μm or less, and the pigment for use in the secondary agglomeration preferably has an average particle diameter of 0.2 μm or more. This agglomeration method ensures penetration of the pigment through the inside of the porous monodispersed particles, thereby producing colored monodisperse particles containing a large amount of pigment.

Another method for increasing the amount of pigment incorporated in the porous monodispersed particles comprises using a pigment of which the charge is equal to the charge on the surface of the porous monodispersed particles, and adding an additive for lowering the surface tension while agglomerating the pigment in the porous monodispersed particles. Examples of the additive include one or more lower alcohols selected from methanol, ethanol, isopropyl alcohol, and butanol, among which isopropyl alcohol is preferably used. One preferable method to accomplish agglomeration using this additive comprises adding an additive to a dispersion of the porous monodispersed particles and the pigment in water or the like, and stirring the dispersion for about 0.5 to 3 hours while heating it at a temperature not more than the boiling point of the azeotrope of water and the additive. In this agglomeration method, it is possible to stir the dispersion of the porous monodispersed particles and the pigment dispersed in water or the like prior to adding the additive at about room temperature for about 0.5 to 3 hours. This agglomeration method is preferable, because a single pigment can be densely adsorbed in the inside and on the surface of the porous monodispersed particles in an efficient manner. The surface charge in the porous monodispersed particles can be determined, for example, by the zeta potential of an emulsion in which the porous monodispersed particles are diluted to about 50 ppm, measured using a Zetasizer 3000HS (manufactured by Sysmex Corporation).

In preparing the colored monodispersed particles of the invention, the particles are preferably treated using a mechano-chemical process, subsequent to the pigment agglomeration, whereby the agglomerated pigment is fixed. The mechano-chemical process can be performed using a commercially available ball mill, an automatic mortar, a hybridization system (a system manufactured by Nara Machinery Co., Ltd.), a mechanofusion system (a system manufactured by Hosokawa Micron Corporation), or the like. Among these examples, a hybridization system, which fixes a pigment by impacting in an air stream, is preferable.

The colored monodispersed particles according to the invention obtained as described above are monodispersed and contain a pigment incorporated in an amount of 2 to 30% by mass, and preferably 5 to 18% by mass.

The colored monodispersed particles contain a large amount of pigment incorporated therein, are monodispersed and spherical, and have a uniform particle diameter, and therefore can be advantageously used as a display element of electronic paper, a spacer for liquid crystal display panels, a toner for printers, a cosmetic product, and the like.

EXAMPLES

The invention will be explained in more detail by examples which are not intended to be limiting of the invention.

Preparation Example 1

Preparation of Seed Particles A (First Step)

A 1 L separable flask was charged with 84 parts by weight of methyl methacrylate as a swelling monomer, 1.3 parts by weight of benzoylperoxide, 0.7 parts by weight of sodium dodecylbenzenesulfonate, and 200 mL of water, and the mixture was emulsified using a homogenizer. After the addition of 15.4 parts by weight of PMMA seed particles with a particle diameter of 0.4 μm (MP-1100 manufactured by Soken Chemical & Engineering Co., Ltd.), the emulsion was stirred at 80 rpm at 50° C. for 40 minutes to become swollen and polymerized while further stirring at 75° C. for 1.5 hours to produce seed particles A. The resulting seed particles were observed by SEM to confirm that the average particle diameter was 0.75 μm and the particles were monodispersed (CV value: 2.1%).

Preparation Example 2

Preparation of Seed Particles B (Second Step)

Seed particles B were produced in the same manner as in Preparation Example 1, except for using 82.1 parts by weight of methyl methacrylate as a swelling monomer and 17.9 parts by weight of the seed particles A obtained in the Preparation Example 1 as seed particles. The resulting seed particles were observed by SEM to confirm that the average particle diameter was 1.3 μm and the particles were monodispersed (CV value: 2.0%). The weight average molecular weight (Mw) measured by gel permeation chromatography (GPC, column: HXL-H, G7000HXL, GMHXL-L, and G2500HXL (manufactured by Tosoh Corp.), detector: a refractive index detector) was 220,000.

Preparation Example 3

Preparation of Seed Particles C (Second Step)

Seed particles C were produced in the same manner as in Preparation Example 1, except for using 88.1 parts by weight of methyl methacrylate as a swelling monomer and 11.9 parts by weight of the seed particles A obtained in the Preparation Example 1 as seed particles. The resulting seed particles were observed by SEM to confirm that the average particle diameter was 1.5 μm and the particles were monodispersed (CV value: 2.1%). The weight average molecular weight was 232,000.

Preparation Example 4

Preparation of Seed Particles D (Third Step)

Seed particles D were produced in the same manner as in Preparation Example 1, except for using 90.7 parts by weight of methyl methacrylate as a swelling monomer and 9.3 parts by weight of the seed particles B obtained in the Preparation Example 2 as seed particles. The resulting seed particles were observed by SEM to confirm that the average particle diameter was 2.9 μm and the particles were monodispersed (CV value: 2.2%). The weight average molecular weight was 220,000.

Preparation Example 5

Preparation of Seed Particles E (Third Step)

Seed particles E were produced in the same manner as in Preparation Example 1, except for using 60.7 parts by weight of methyl methacrylate and 30 parts by weight of ethyl methacrylate as swelling monomers and 9.3 parts by weight of the seed particles B obtained in the Preparation Example 2 as seed particles. The resulting seed particles were observed by SEM to confirm that the average particle diameter was 2.9 μm and the particles were monodispersed (CV value: 2.4%). The weight average molecular weight was 215,000.

Preparation Example 6

Preparation of Seed Particles F (Third Step)

Seed particles F were produced in the same manner as in Preparation Example 1, except for using 60.7 parts by weight of methyl methacrylate and 30 parts by weight of isobutyl methacrylate as swelling monomers and 9.3 parts by weight of the seed particles B obtained in the Preparation Example 2 as seed particles. The resulting seed particles were observed by SEM to confirm that the average particle diameter was 2.9 μm and the particles were monodispersed (CV value: 2.4%). The weight average molecular weight was 200,000.

Preparation Example 7

Preparation of Seed Particles G (Third Step)

Seed particles G were produced in the same manner as in Preparation Example 1, except for using 81.6 parts by weight of methyl methacrylate and 9.1 parts by weight of lauryl methacrylate as swelling monomers and 9.3 parts by weight of the seed particles B obtained in the Preparation Example 2 as seed particles. The resulting seed particles were observed by SEM to confirm that the average particle diameter was 2.9 μm and the particles were monodispersed (CV value: 2.3%). The weight average molecular weight was 220,000.

Preparation Example 8

Preparation of Seed Particles H (Third Step)

Seed particles H were produced in the same manner as in Preparation Example 1, except for using 85.6 parts by weight of methyl methacrylate and 5.1 parts by weight of styrene as swelling monomers and 9.3 parts by weight of the seed particles B obtained in the Preparation Example 2 as seed particles. The resulting seed particles were observed by SEM to confirm that the average particle diameter was 2.9 μm and the particles were monodispersed (CV value: 2.0%). The weight average molecular weight was 235,000.

Preparation Example 9

Preparation of Seed Particles I (Third Step)

Seed particles I were produced in the same manner as in Preparation Example 1, except for using 90.7 parts by weight of ethyl methacrylate as a swelling monomer and 9.3 parts by weight of the seed particles B obtained in the Preparation Example 2 as seed particles. The resulting seed particles were observed by SEM to confirm that the average particle diam-

Preparation Example 10

Preparation of Seed Particles J (Third Step)

Seed particles J were produced in the same manner as in Preparation Example 1, except for using 90.7 parts by weight of isobutyl methacrylate as a swelling monomer and 9.3 parts by weight of the seed particles B obtained in the Preparation Example 2 as seed particles. The resulting seed particles were observed by SEM to confirm that the average particle diameter was 2.9 µm and the particles were monodispersed (CV value: 2.7%). The weight average molecular weight was 215,000.

Preparation Example 11

Preparation of Seed Particles K (Third Step)

Seed particles K were produced in the same manner as in Preparation Example 1, except for using 90.7 parts by weight of styrene as a swelling monomer and 9.3 parts by weight of the seed particles B obtained in the Preparation Example 2 as seed particles. The resulting seed particles were observed by SEM to confirm that the average particle diameter was 2.9 µm and the particles were monodispersed (CV value: 2.1%). The weight average molecular weight was 200,000.

Preparation Example 12

Preparation of Seed Particles L (Third Step)

Seed particles L were produced in the same manner as in Preparation Example 1, except for using 40.8 parts by weight of methyl methacrylate and 49.9 parts by weight of styrene as swelling monomers and 9.3 parts by weight of the seed particles B obtained in the Preparation Example 2 as seed particles. The resulting seed particles were observed by SEM to confirm that the average particle diameter was 2.9 µm and the particles were monodispersed (CV value: 2.1%). The weight average molecular weight was 205,000.

Preparation Example 13

Preparation of Seed Particles M (Second Step)

Seed particles M were produced in the same manner as in Preparation Example 1, except for using 88.1 parts by weight of methyl methacrylate and 0.1 part by weight of n-dodecylmercaptan (NDM) as swelling monomers and 11.9 parts by weight of the seed particles A obtained in the Preparation Example 1 as seed particles. The resulting seed particles were observed by SEM to confirm that the average particle diameter was 1.5 µm and the particles were monodispersed (CV value: 2.1%). The weight average molecular weight was 113,000.

Preparation Example 14

Preparation of Seed Particles N (Second Step)

Seed particles N were produced in the same manner as in Preparation Example 1, except for using 88.1 parts by weight of methyl methacrylate and 0.7 parts by weight of benzoylperoxide as swelling monomers and 11.9 parts by weight of the seed particles A obtained in the Preparation Example 1 as seed particles. The resulting seed particles were observed by SEM to confirm that the average particle diameter was 1.5 µm and the particles were monodispersed (CV value: 2.3%). The weight average molecular weight was 261,000.

Preparation Example 15

Preparation of Seed Particles O (Third Step)

Seed particles O were produced in the same manner as in Preparation Example 1, except for using 90.7 parts by weight of methyl methacrylate and 0.5 parts by weight of benzoylperoxide as swelling monomers and 9.3 parts by weight of the seed particles B obtained in the Preparation Example 2 as seed particles. The resulting seed particles were observed by SEM to confirm that the average particle diameter was 2.9 µm and the particles were monodispersed (CV value: 2.2%). The weight average molecular weight was 300,000.

Preparation Example 16

Preparation of Seed Particles P (Third Step)

Seed particles P were produced in the same manner as in Preparation Example 1, except for using 90.7 parts by weight of methyl methacrylate and 3.1 parts by weight of benzoylperoxide as swelling monomers and 9.3 parts by weight of the seed particles B obtained in the Preparation Example 2 as seed particles. The resulting seed particles were observed by SEM to confirm that the average particle diameter was 2.9 µm and the particles were monodispersed (CV value: 2.3%). The weight average molecular weight was 205,000.

Preparation Example 17

Preparation of Seed Particles Q (Third Step)

Seed particles Q were produced in the same manner as in Preparation Example 1, except for using 90.7 parts by weight of methyl methacrylate and 0.05 parts by weight of n-dodecylmercaptan (NDM) as swelling monomers and 9.3 parts by weight of the seed particles B obtained in the Preparation Example 2 as seed particles. The resulting seed particles were observed by SEM to confirm that the average particle diameter was 2.9 µm and the particles were monodispersed (CV value: 2.1%). The weight average molecular weight was 187,000.

Preparation Example 18

Preparation of Seed Particles R (Third Step)

Seed particles R were produced in the same manner as in Preparation Example 1, except for using 90.7 parts by weight of methyl methacrylate and 0.2 parts by weight of n-dodecylmercaptan (NDM) as swelling monomers and 9.3 parts by weight of the seed particles B obtained in the Preparation Example 2 as seed particles. The resulting seed particles were observed by SEM to confirm that the average particle diameter was 2.9 μm and the particles were monodispersed (CV value: 2.1%). The weight average molecular weight was 128,000.

Example 1

Preparation of Porous Monodispersed Particles (1)

A separable flask was charged with a monomer mixture containing 95 parts by weight of methyl methacrylate and 5 parts by weight of divinylbenzene, 1.3 parts by weight of benzoylperoxide, 0.7 parts by weight of an emulsifier (TP-BN-2070M, manufactured by TAYCA Corp.), and 200 parts by weight of water, and the mixture was emulsified using a homogenizer. After the addition of 2.5 parts by weight of the seed particles D prepared in Preparation Example 4 (poly(methyl methacrylate) particles with a weight average molecular weight of 220,000 and an average particle diameter of 2.9 μm), the mixture was stirred at 50° C. for 40 minutes to become swollen. After the addition of 0.5 parts by weight of polyvinyl alcohol, the mixture was stirred to swell to 40 times the original mass. After swelling, 1.5 parts by weight of polyvinyl alcohol was further added, followed by polymerization at 75° C. for 1.5 hours while stirring to produce porous monodispersed particles. After the polymerization, the polymer solution was filtered. The filtrate was washed with an aqueous solution of isopropyl alcohol and water, followed by filtration. This washing-filtration operation was carried out twice to remove the monomers and the emulsifying agent, thereby obtaining particles.

Figure 1:
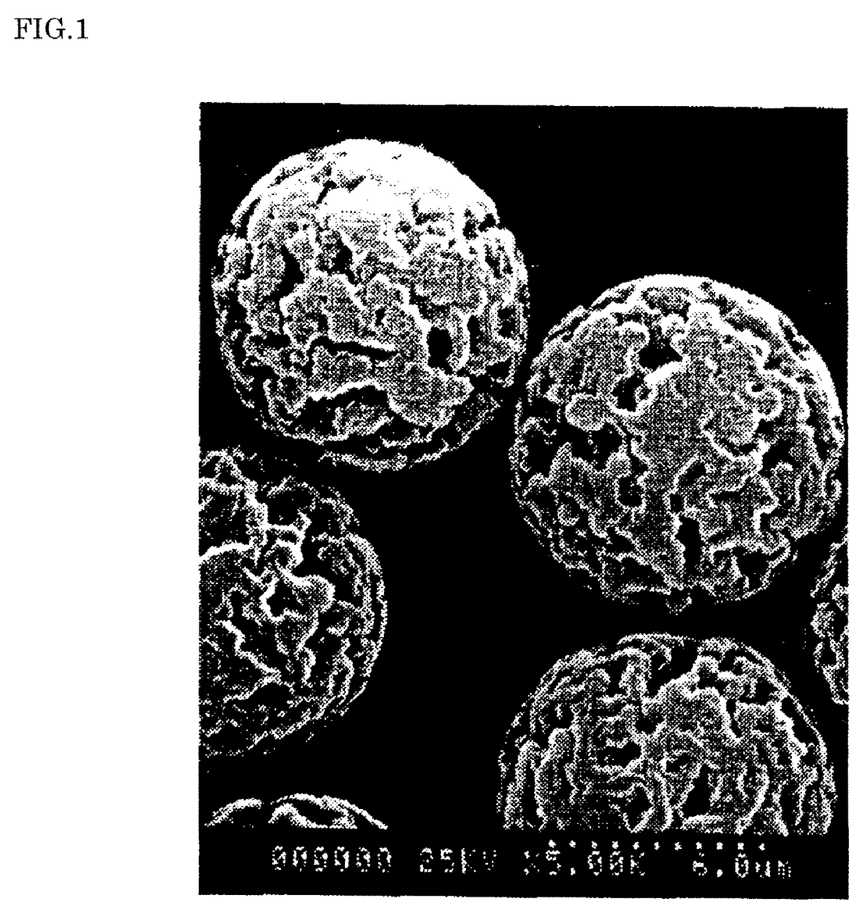
FIG. 1 is an SEM image of porous monodispersed particles prepared in Example 1.

The resulting particles were observed by SEM to confirm that the particle diameter was 10 μm (FIG. 1). The form of particles was evaluated by an SEM image. As a result, the particles were found to be spherical and porous. In addition, dispersibility was evaluated by the CV value. The CV value was calculated from the coefficient of variation of the particle diameter of 2,000 particles measured using an SEM photograph. As a result, the CV value was found to be 2.5%, indicating that the particles were monodispersed. In addition, the specific surface area of the particles was measured using Macsorb 1208 (manufactured by Mountech Co., Ltd.) to find that the specific surface area was 2.1 m$^2$/g. As a result, the particles obtained in this example were confirmed to be porous monodispersed particles. Furthermore, the zeta-potential of the particles was measured by Zetasizer 3000HS (manufactured by Sysmex Corp.) to confirm that the zeta-potential was −30 mV.

Example 2

Preparation of Porous Monodispersed Particles (2)

Porous monodispersed particles were prepared in the same manner as in Example 1, except for using the seed particles P prepared in Preparation Example 16 (poly(methyl methacrylate) particles with a weight average molecular weight of 205,000 and an average particle diameter of 2.9 μm) as seed particles. The resulting particles were evaluated in the same manner as in Example 1 to confirm that the particles were monodispersed with a CV value of 2.7%, were spherical and porous, and had an average particle diameter of 10 μm and a specific surface area of 2.4 m$^2$/g.

Example 3

Preparation of Porous Monodispersed Particles (3)

Porous monodispersed particles were prepared in the same manner as in Example 1, except for using the seed particles D prepared in Preparation Example 4 (poly(methyl methacrylate) particles with a weight average molecular weight of 220,000 and an average particle diameter of 2.9 μm) as seed particles, and a mixture of 90 parts by weight of methyl methacrylate, 5 parts by weight of styrene, and 5 parts by weight of divinylbenzene as a monomer mixture. The resulting particles were evaluated in the same manner as in Example 1 to confirm that the particles were monodispersed with a CV value of 2.7%, were spherical and porous, and had an average particle diameter of 10 μm and a specific surface area of 2.5 m$^2$/g.

Example 4

Preparation of Porous Monodispersed Particles (4)

Porous monodispersed particles were prepared in the same manner as in Example 1, except for using the seed particles D prepared in Preparation Example 4 (poly(methyl methacrylate) particles with a weight average molecular weight of 220,000 and an average particle diameter of 2.9 μm) as seed particles, and a mixture of 93 parts by weight of methyl methacrylate, 2 parts by weight of styrene, and 5 parts by weight of divinylbenzene as a monomer mixture. The resulting particles were evaluated in the same manner as in Example 1 to confirm that the particles were monodispersed with a CV value of 2.6%, were spherical and porous, and had an average particle diameter of 10 μm and a specific surface area of 2.3 m$^2$/g.

Example 5

Preparation of Porous Monodispersed Particles (5)

Porous monodispersed particles were prepared in the same manner as in Example 1, except for using the seed particles D prepared in Preparation Example 4 (poly(methyl methacrylate) particles with a weight average molecular weight of 220,000 and an average particle diameter of 2.9 μm) as seed particles, and a mixture of 70 parts by weight of methyl methacrylate, 25 parts by weight of isobutyl methacrylate, and 5 parts by weight of divinylbenzene as a monomer mixture. The resulting particles were evaluated in the same manner as in Example 1 to confirm that the particles were monodispersed with a CV value of 2.8%, were spherical and porous, and had an average particle diameter of 10 μm and a specific surface area of 1.8 m$^2$/g.

Example 6

Preparation of Porous Monodispersed Particles (6)

Porous monodispersed particles were prepared in the same manner as in Example 1, except for using the seed particles D prepared in Preparation Example 4 (poly(methyl methacrylate) particles with a weight average molecular weight of 220,000 and an average particle diameter of 2.9 μm) as seed particles, and a mixture of 90 parts by weight of methyl methacrylate, 5 parts by weight of lauryl methacrylate, and 5 parts by weight of divinylbenzene as a monomer mixture. The resulting particles were evaluated in the same manner as in Example 1 to confirm that the particles were monodispersed with a CV value of 2.6%, were spherical and porous, and had an average particle diameter of 10 μm and a specific surface area of 1.8 m²/g.

Example 7

Preparation of Porous Monodispersed Particles (7)

Porous monodispersed particles were prepared in the same manner as in Example 1, except for using the seed particles D prepared in Preparation Example 4 (poly(methyl methacrylate) particles with a weight average molecular weight of 220,000 and an average particle diameter of 2.9 μm) as seed particles, and a mixture of 85 parts by weight of methyl methacrylate, 10 parts by weight of ethyl methacrylate, and 5 parts by weight of divinylbenzene as a monomer mixture. The resulting particles were evaluated in the same manner as in Example 1 to confirm that the particles were monodispersed with a CV value of 2.6%, were spherical and porous, and had an average particle diameter of 10 μm and a specific surface area of 2.1 m²/g.

Example 8

Preparation of Porous Monodispersed Particles (8)

Porous monodispersed particles were prepared in the same manner as in Example 1, except for using the seed particles E prepared in Preparation Example 5 (particles containing copolymer components of 70% by mass of methyl methacrylate and 30% by mass of ethyl methacrylate, having a weight average molecular weight of 215,000 and an average particle diameter of 2.9 μm) as seed particles. The resulting particles were evaluated in the same manner as in Example 1 to confirm that the particles were monodispersed with a CV value of 2.3%, were spherical and porous, and had an average particle diameter of 10 μm and a specific surface area of 2.0 m²/g.

Example 9

Preparation of Porous Monodispersed Particles (9)

Porous monodispersed particles were prepared in the same manner as in Example 1, except for using the seed particles F prepared in Preparation Example 6 (particles containing copolymer components of 70% by mass of methyl methacrylate and 30% by mass of isobutyl methacrylate, having a weight average molecular weight of 200,000 and an average particle diameter of 2.9 μm) as seed particles. The resulting particles were evaluated in the same manner as in Example 1 to confirm that the particles were monodispersed with a CV value of 2.8%, were spherical and porous, and had an average particle diameter of 10 μm and a specific surface area of 1.8 m²/g.

Example 10

Preparation of Porous Monodispersed Particles (10)

Porous monodispersed particles were prepared in the same manner as in Example 1, except for using the seed particles G prepared in Preparation Example 7 (particles containing copolymer components of 91% by mass of methyl methacrylate and 9% by mass of lauryl methacrylate, having a weight average molecular weight of 220,000 and an average particle diameter of 2.9 μm) as seed particles. The resulting particles were evaluated in the same manner as in Example 1 to confirm that the particles were monodispersed with a CV value of 2.4%, were spherical and porous, and had an average particle diameter of 10 μm and a specific surface area of 1.8 m²/g.

Example 11

Preparation of Porous Monodispersed Particles (11)

Porous monodispersed particles were prepared in the same manner as in Example 1, except for using the seed particles H prepared in Preparation Example 8 (particles containing copolymer components of 95% by mass of methyl methacrylate and 5% by mass of styrene, having a weight average molecular weight of 235,000 and an average particle diameter of 2.9 μm) as seed particles. The resulting particles were evaluated in the same manner as in Example 1 to confirm that the particles were monodispersed with a CV value of 2.8%, were spherical and porous, and had an average particle diameter of 10 μm and a specific surface area of 2.1 m²/g.

Example 12

Preparation of Porous Monodispersed Particles (12)

Porous monodispersed particles were prepared in the same manner as in Example 1, except for using the seed particles C prepared in Preparation Example 3 (poly(methyl methacrylate) particles with a weight average molecular weight of 232,000 and an average particle diameter of 1.5 μm) as seed particles, a mixture of 96 parts by weight of methyl methacrylate and 4 parts by weight of divinylbenzene as a monomer mixture, and applying a swelling magnification of 35 times. The resulting particles were evaluated in the same manner as in Example 1 to confirm that the particles were monodispersed with a CV value of 2.8%, were spherical and porous, and had an average particle diameter of 5 μm and a specific surface area of 1.9 m²/g.

Example 13

Preparation of Porous Monodispersed Particles (13)

Porous monodispersed particles were prepared in the same manner as in Example 1, except for using the seed particles N prepared in Preparation Example 14 (poly(methyl methacrylate) particles with a weight average molecular weight of 261,000 and an average particle diameter of 1.5 μm) as seed particles, a mixture of 96 parts by weight of methyl methacrylate and 4 parts by weight of divinylbenzene as a monomer mixture, and applying a swelling magnification of 35 times. The resulting particles were evaluated in the same manner as in Example 1 to confirm that the particles were monodispersed with a CV value of 2.6%, were spherical and porous, and had an average particle diameter of 5 μm and a specific surface area of 1.8 m²/g.

Example 14

Preparation of Porous Monodispersed Particles (14)

Porous monodispersed particles were prepared in the same manner as in Example 1, except for using the seed particles D prepared in Preparation Example 4 (poly(methyl methacrylate) particles with a weight average molecular weight of 220,000 and an average particle diameter of 2.9 μm) as seed particles, and a mixture of 97 parts by weight of methyl methacrylate and 3 parts by weight of divinylbenzene as a monomer mixture. The resulting particles were evaluated in the same manner as in Example 1 to confirm that the particles were monodispersed with a CV value of 2.6%, were spherical and porous, and had an average particle diameter of 10 μm and a specific surface area of 2.3 m$^2$/g.

Example 15

Preparation of Porous Monodispersed Particles (15)

Porous monodispersed particles were prepared in the same manner as in Example 1, except for using the seed particles D prepared in Preparation Example 4 (poly(methyl methacrylate) particles with a weight average molecular weight of 220,000 and an average particle diameter of 2.9 μm) as seed particles, and a mixture of 92 parts by weight of methyl methacrylate and 8 parts by weight of divinylbenzene as a monomer mixture. The resulting particles were evaluated in the same manner as in Example 1 to confirm that the particles were monodispersed with a CV value of 2.9%, were spherical and porous, and had an average particle diameter of 10 μm and a specific surface area of 2.2 m$^2$/g.

Example 16

Preparation of Porous Monodispersed Particles (16)

Porous monodispersed particles were prepared in the same manner as in Example 1, except for using the seed particles B prepared in Preparation Example 2 (poly(methyl methacrylate) particles with a weight average molecular weight of 220,000 and an average particle diameter of 1.3 μm) as seed particles, a mixture of 97 parts by weight of methyl methacrylate and 3 parts by weight of divinylbenzene as a monomer mixture, and applying a swelling magnification of 27 times. The resulting particles were evaluated in the same manner as in Example 1 to confirm that the particles were monodispersed with a CV value of 2.2%, were spherical and porous, and had an average particle diameter of 4 μm and a specific surface area of 2.5 m$^2$/g.

Example 17

Preparation of Porous Monodispersed Particles (17)

Porous monodispersed particles were prepared in the same manner as in Example 1, except for using the seed particles D prepared in Preparation Example 4 (poly(methyl methacrylate) particles with a weight average molecular weight of 220,000 and an average particle diameter of 2.9 μm) as seed particles, and applying a swelling magnification of 80 times. The resulting particles were evaluated in the same manner as in Example 1 to confirm that the particles were monodispersed with a CV value of 3.0%, were spherical and porous, and had an average particle diameter of 12.5 μm and a specific surface area of 1.6 m$^2$/g.

Example 18

Preparation of Porous Monodispersed Particles (18)

Porous monodispersed particles were prepared in the same manner as in Example 1, except for using the seed particles Q prepared in Preparation Example 17 (poly(methyl methacrylate) particles with a weight average molecular weight of 187,000 and an average particle diameter of 2.9 μm) as seed particles. The resulting particles were evaluated in the same manner as in Example 1 to confirm that the particles were monodispersed with a CV value of 2.7%, were spherical and porous, and had an average particle diameter of 10 μm and a specific surface area of 1.8 m$^2$/g.

Example 19

Preparation of Porous Monodispersed Particles (19)

Porous monodispersed particles were prepared in the same manner as in Example 1, except for using the seed particles D prepared in Preparation Example 4 (poly(methyl methacrylate) particles with a weight average molecular weight of 220,000 and an average particle diameter of 2.9 μm) as seed particles, and a mixture of 85 parts by weight of methyl methacrylate, 10 parts by weight of styrene, and 5 parts by weight of divinylbenzene as a monomer mixture. The resulting particles were evaluated in the same manner as in Example 1 to confirm that the particles were monodispersed with a CV value of 2.6%, were spherical and partially porous, and had an average particle diameter of 10 μm and a specific surface area of 0.9 m$^2$/g.

Example 20

Preparation of Porous Monodispersed Particles (20)

Porous monodispersed particles were prepared in the same manner as in Example 1, except for using the seed particles R prepared in Preparation Example 18 (poly(methyl methacrylate) particles with a weight average molecular weight of 128,000 and an average particle diameter of 2.9 μm) as seed particles. The resulting particles were evaluated in the same manner as in Example 1 to confirm that the particles were monodispersed with a CV value of 2.4%, were spherical and partially porous, and had an average particle diameter of 10 μm and a specific surface area of 0.7 m$^2$/g.

Example 21

Preparation of Porous Monodispersed Particles (21)

Porous monodispersed particles were prepared in the same manner as in Example 1, except for using the seed particles M prepared in Preparation Example 13 (poly(methyl methacrylate) particles with a weight average molecular weight of 113,000 and an average particle diameter of 1.5 μm) as seed particles, a mixture of 96 parts by weight of methyl methacrylate and 4 parts by weight of divinylbenzene as a monomer mixture, and applying a swelling magnification of 35 times. The resulting particles were evaluated in the same manner as in Example 1 to confirm that the particles were monodispersed with a CV value of 2.6%, were spherical and partially porous, and had an average particle diameter of 5 μm and a specific surface area of 1.1 m$^2$/g.

Example 22

Preparation of Porous Monodispersed Particles (22)

Porous monodispersed particles were prepared in the same manner as in Example 1, except for using the seed particles O prepared in Preparation Example 15 (poly(methyl methacrylate) particles with a weight average molecular weight of 300,000 and an average particle diameter of 2.9 µm) as seed particles. The resulting particles were evaluated in the same manner as in Example 1 to confirm that the particles were monodispersed with a CV value of 2.9%, were spherical and partially porous, and had an average particle diameter of 10 µm and a specific surface area of 0.9 m²/g.

Comparative Example 1

Preparation of Comparative Particles (1)

Particles were prepared in the same manner as in Example 1, except for using the seed particles D prepared in Preparation Example 4 (poly(methyl methacrylate) particles with a weight average molecular weight of 220,000 and an average particle diameter of 2.9 µm) as seed particles, and a mixture of 99 parts by weight of methyl methacrylate and 1 part by weight of divinylbenzene as a monomer mixture. The resulting particles were evaluated in the same manner as in Example 1 to confirm that the particles were monodispersed with a CV value of 2.8%, were irregular in shape and non-porous, and had an average particle diameter of 10 µm and a specific surface area of 0.6 m²/g.

Comparative Example 2

Preparation of Comparative Particles (2)

Particles were prepared in the same manner as in Example 1, except for using the seed particles D prepared in Preparation Example 4 (poly(methyl methacrylate) particles with a weight average molecular weight of 220,000 and an average particle diameter of 2.9 µm) as seed particles, and a mixture of 90 parts by weight of methyl methacrylate and 10 parts by weight of divinylbenzene as a monomer mixture. The resulting particles were evaluated in the same manner as in Example 1 to confirm that the particles were monodispersed with a CV value of 7.2%, were spherical with one spherical void in each particle, and had an average particle diameter of 10 µm and a specific surface area of 0.8 m²/g.

Comparative Example 3

Preparation of Comparative Particles (3)

Particles were prepared in the same manner as in Example 1, except for using the seed particles D prepared in Preparation Example 4 (poly(methyl methacrylate) particles with a weight average molecular weight of 220,000 and an average particle diameter of 2.9 µm) as seed particles, and a mixture of 80 parts by weight of methyl methacrylate and 20 parts by weight of divinylbenzene as a monomer mixture. The resulting particles were evaluated in the same manner as in Example 1 to confirm that the particles were polydispersed with a CV value of 27%, were spherical with one spherical void in each particle, and had an average particle diameter of 10 µm and a specific surface area of 0.8 m²/g.

Comparative Example 4

Preparation of Comparative Particles (4)

Particles were prepared in the same manner as in Example 1, except for using the seed particles D prepared in Preparation Example 4 (poly(methyl methacrylate) particles with a weight average molecular weight of 220,000 and an average particle diameter of 2.9 µm) as seed particles, and a mixture of 95 parts by weight of styrene and 5 parts by weight of divinylbenzene as a monomer mixture. The resulting particles were evaluated in the same manner as in Example 1 to confirm that the particles were monodispersed with a CV value of 2.6%, were spherical and non-porous, and had an average particle diameter of 10 µm and a specific surface area of 0.6 m²/g.

Comparative Example 5

Preparation of Comparative Particles (5)

Particles were prepared in the same manner as in Example 1, except for using the seed particles K prepared in Preparation Example 11 (particles containing copolymer components of 9% by mass of methyl methacrylate and 91% by mass of styrene, having a weight average molecular weight of 200,000 and an average particle diameter of 2.9 µm) as seed particles. The resulting particles were evaluated in the same manner as in Example 1 to confirm that the particles were monodispersed with a CV value of 2.9%, were spherical and non-porous, and had an average particle diameter of 10 µm and a specific surface area of 0.6 m²/g.

Comparative Example 6

Preparation of Comparative Particles (6)

Particles were prepared in the same manner as in Example 1, except for using the seed particles I prepared in Preparation Example 9 (particles containing copolymer components of 9% by mass of methyl methacrylate and 91% by mass of ethyl methacrylate, having a weight average molecular weight of 229,000 and an average particle diameter of 2.9 µm) as seed particles. The resulting particles were evaluated in the same manner as in Example 1 to confirm that the particles were monodispersed with a CV value of 2.2%, were irregular in shape and non-porous, and had an average particle diameter of 10 µm and a specific surface area of 0.7 m²/g.

Comparative Example 7

Preparation of Comparative Particles (7)

Particles were prepared in the same manner as in Example 1, except for using the seed particles J prepared in Preparation Example 10 (particles containing copolymer components of 9% by mass of methyl methacrylate and 91% by mass of isobutyl methacrylate, having a weight average molecular weight of 215,000 and an average particle diameter of 2.9 µm) as seed particles. The resulting particles were evaluated in the same manner as in Example 1 to confirm that the particles were monodispersed with a CV value of 3.0%, were irregular in shape and non-porous, and had an average particle diameter of 10 µm and a specific surface area of 0.7 m²/g.

Comparative Example 8

Preparation of Comparative Particles (8)

Particles were prepared in the same manner as in Example 1, except for using the seed particles D prepared in Preparation Example 4 (poly(methyl methacrylate) particles with a weight average molecular weight of 220,000 and an average particle diameter of 2.9 µm) as seed particles, and a mixture of 50 parts by weight of methyl methacrylate, 45 parts by weight of isobutyl methacrylate, and 5 parts by weight of divinylbenzene as a monomer mixture. The resulting particles were evaluated in the same manner as in Example 1 to confirm that the particles were monodispersed with a CV value of 2.9%, were irregular in shape and non-porous, and had an average particle diameter of 10 μm and a specific surface area of 0.9 m²/g.

Comparative Example 9

Preparation of Comparative Particles (9)

Particles were prepared in the same manner as in Example 1, except for using the seed particles L prepared in Preparation Example 12 (particles containing copolymer components of 50% by mass of methyl methacrylate and 50% by mass of butyl methacrylate, having a weight average molecular weight of 205,000 and an average particle diameter of 2.9 μm) as seed particles. The resulting particles were evaluated in the same manner as in Example 1 to confirm that the particles were monodispersed with a CV value of 2.2%, were spherical and non-porous, and had an average particle diameter of 10 μm and a specific surface area of 1.2 m²/g.

Comparative Example 10

Preparation of Comparative Particles (10)

Particles were prepared in the same manner as in Example 1, except for using the seed particles D prepared in Preparation Example 4 (poly(methyl methacrylate) particles with a weight average molecular weight of 220,000 and an average particle diameter of 2.9 μm) as seed particles, and applying a swelling magnification of 10 times. The resulting particles were evaluated in the same manner as in Example 1 to confirm that the particles were monodispersed with a CV value of 2.5%, were spherical and non-porous, and had an average particle diameter of 6.2 μm and a specific surface area of 1.3 m²/g.

Comparative Example 11

Preparation of Comparative Particles (11)

Particles were prepared in the same manner as in Example 1, except for using the seed particles D prepared in Preparation Example 4 (poly(methyl methacrylate) particles with a weight average molecular weight of 220,000 and an average particle diameter of 2.9 μm) as seed particles, and applying a swelling magnification of 100 times. The resulting particles were evaluated in the same manner as in Example 1 to confirm that the particles were polydispersed with a CV value of 16%, were spherical and porous, and had an average particle diameter of 13.5 μm.

Example 23

Preparation of Colored Monodispersed Particles (1)

Figure 2:
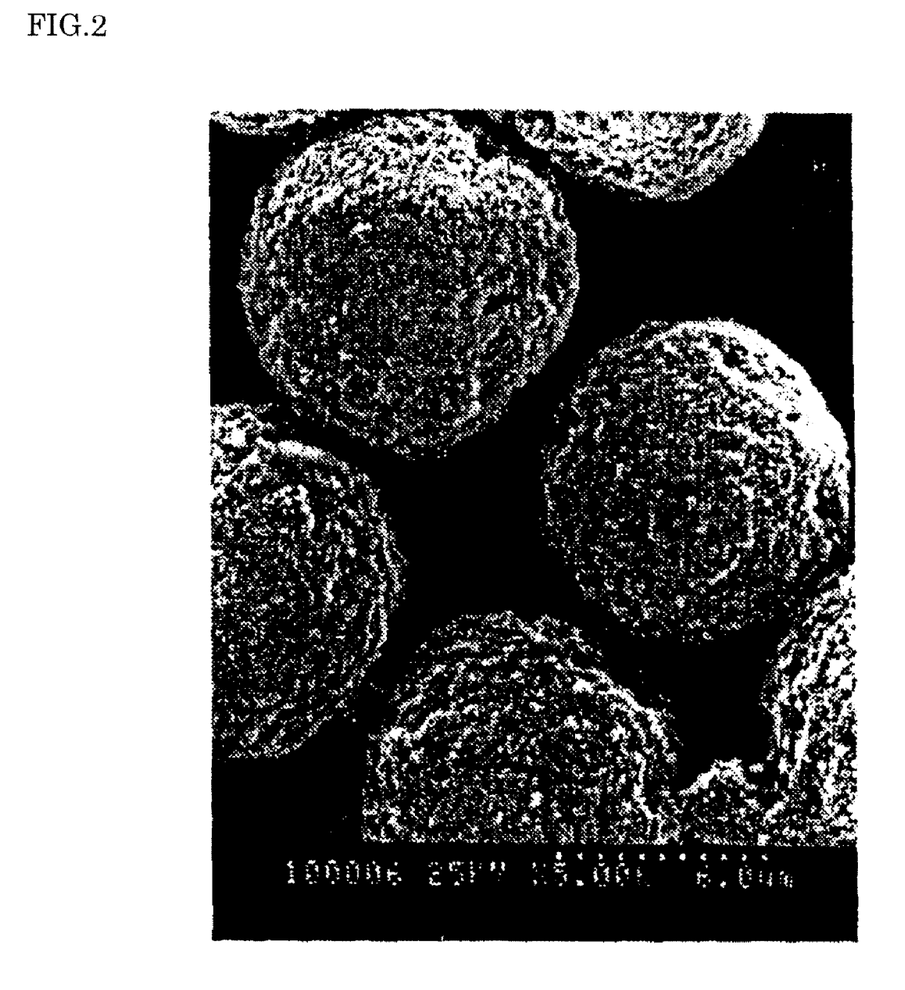
FIG. 2 is an SEM image of composite particles prepared in Example 23.

A separable flask was charged with 90 parts by weight of the porous monodispersed particles prepared in Example 1. 6 parts by weight of an anionic black pigment (carbon black; Bonjet Black CW1, average particle diameter: 0.1 μm, manufactured by Orient Chemical Industries, Ltd.) and 900 parts by weight of water were added, and the mixture was heated at 90° C. for one hour. Then, 8 parts by weight of a nonionic black pigment (carbon black, PSM-Black C, average particle diameter: 0.25 μm, manufactured by Mikuni Color Co., Ltd.) was added, and the mixture was heated at 90° C. for one hour to agglomerate the pigment in the porous monodispersed particles. After the agglomeration treatment, the treated liquid was filtered. The filtrate was washed with an alcoholic aqueous solution, and then with water to remove the excess pigment and the emulsifying agent. After the washing treatment, the resulting composite particles of the pigments and porous monodispersed particles were filtered and dried at 110° C. for 24 hours. The dry composite particles were observed by SEM. The results are shown in FIG. 2.

Figure 3:
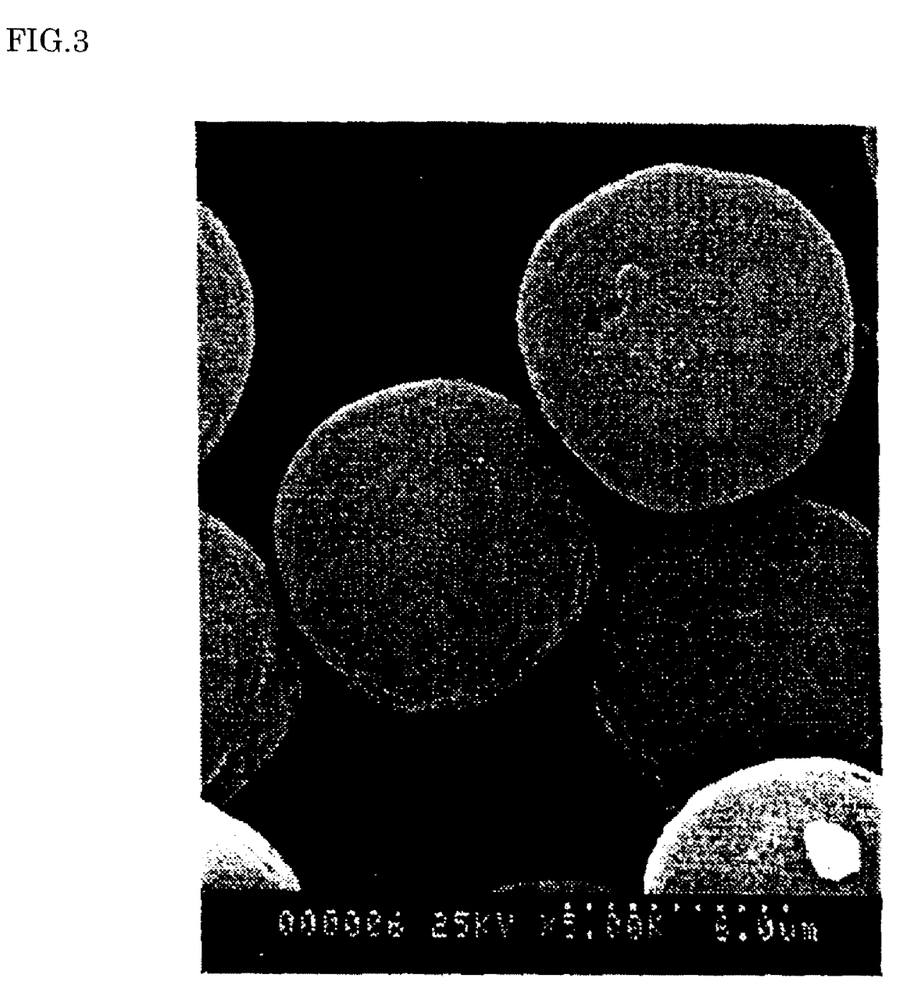
FIG. 3 is an SEM image of colored monodispersed particles prepared in Example 23.

The dried composite particles were processed by a hybridizer (a product of Nara Machinery Co., Ltd.) at 7,000 rpm for 5 minutes to obtain colored monodispersed particles in which the pigments were incorporated. A thermal decomposition experiment confirmed that the amount of the pigments incorporated was 10% by mass. The results of the SEM observation of the colored monodispersed particles are shown in FIG. 3.

Example 24

Preparation of Colored Monodispersed Particles (2)

Composite particles were prepared in the same manner as in Example 23, except for using 6 parts by weight of an anionic white pigment (titanium oxide; SA White 14663, average particle diameter: 0.13 μm, manufactured by Mikuni Color Co., Ltd.) instead of the anionic black pigment and 10 parts by weight of an anionic white pigment (titanium oxide; SA White 14664, average particle diameter: 0.27 μm, manufactured by Mikuni Color Co., Ltd.) instead of the nonionic black pigment.

The resulting composite particles were colored monodispersed particles. A thermal decomposition experiment confirmed that the amount of the pigments incorporated was 14% by mass.

Comparative Example 12

Preparation of Comparative Particles (12)

Pigments were agglomerated in polystyrene particles (SX-1000 manufactured by Soken Chemical & Engineering Co., Ltd.) with the same diameter (10 μm) as the porous monodispersed particles under the same conditions as in Example 23. As the pigment, an anionic black pigment (carbon black; Bonjet Black CW1 manufactured by Orient Chemical Industries, Ltd.), a nonionic black pigment (carbon black; PSM-Black C manufactured by Mikuni Color Co., Ltd.), a cationic black pigment (carbon black; Plus Black C manufactured by Mikuni Color Co., Ltd.), and an anionic white pigment (titanium oxide; SA White 14664 manufactured by Mikuni Color Co., Ltd.) were used. No pigments were agglomerated in the polystyrene particles.

Comparative Example 13

Preparation of Comparative Particles (13)

Pigments were agglomerated in non-porous spherical PMMA particle (MX-1000 manufactured by Soken Chemical & Engineering Co., Ltd.) with the same diameter (10 micrometer) as the porous monodispersed particles under the same conditions as in Example 23. An anionic black pigment (carbon black; Bonjet Black CW1 manufactured by Orient Chemical Industries, Ltd.) was used as the pigment. A thermal decomposition experiment confirmed that the amount of the pigments incorporated was 1% by mass.

Example 25

Preparation of Colored Monodispersed Particles (3)

A separable flask was charged with 90 parts by weight of the porous monodispersed particles prepared in Example 1. 15 parts by weight of an anionic yellow pigment (SA Yellow-NF-117 manufactured by Mikuni Color Co., Ltd.) and 900 parts by weight of water were added, and the mixture was stirred at room temperature for one hour. The mixture was heated at 90° C. for one hour to agglomerate the pigment in the porous monodispersed particles. After the agglomeration treatment, the treated liquid was filtered. The filtrate was washed with an alcoholic aqueous solution, and then with water to remove the excess pigment and the emulsifying agent. After the washing treatment, the resulting composite particles of the pigments and porous monodispersed particles were filtered and dried at 110° C. for 24 hours.

The dried composite particles were processed by a hybridizer (a product of Nara Machinery Co., Ltd.) at 7,000 rpm for 5 minutes to obtain colored monodispersed particles in which the pigments were incorporated. A thermal decomposition experiment confirmed that the amount of the pigments incorporated was 4.5% by mass.

Example 26

Preparation of Colored Monodispersed Particles (4)

A separable flask was charged with 90 parts by weight of the porous monodispersed particles prepared in Example 1. 15 parts by weight of an anionic yellow pigment (SA Yellow-NF-117 manufactured by Mikuni Color Co., Ltd.) and 900 parts by weight of water were added, and the mixture was stirred at room temperature for one hour. After the addition of 100 parts by weight of isopropyl alcohol, the mixture was heated to an azeotropic point of about 90° C. and treated with heat for one hour to agglomerate the pigment in the porous monodispersed particles. After the agglomeration treatment, the treated liquid was filtered. The filtrate was washed with an alcoholic aqueous solution, and then with water to remove the excess pigment and the emulsifying agent. After the washing treatment, the resulting composite particles of the pigments and porous monodispersed particles were filtered and dried at 110° C. for 24 hours.

The dried composite particles were processed by a hybridizer (a product of Nara Machinery Co., Ltd.) at 7,000 rpm for 5 minutes to obtain colored monodispersed particles in which the pigments were incorporated. A thermal decomposition experiment confirmed that the amount of the pigments incorporated was 15% by mass.

INDUSTRIAL APPLICABILITY

The porous monodispersed particles of the present invention are porous spherical particles having pores leading to the inside, have a narrow particle size distribution, and are monodispersed. Therefore, utilizing these characteristics, the porous monodispersed particles are useful as a carrier of a pigment, a medicine, and the like, and as an adsorbent, a column, and the like.

In addition, the colored monodispersed particles of the present invention obtained by agglomerating a pigment in the porous monodispersed particles are monodispersed and spherical, and contain a large amount of pigment therein. Therefore, the colored porous monodispersed particles are useful as a display element for electronic paper, a spacer for liquid crystal display panels, a toner of printers, cosmetics, and the like.

The invention claimed is:

1. A method for producing porous monodispersed particles which comprises preparing, as seed particles, poly(methyl methacrylate) particles or acrylic resin particles comprising 70% by mass or more of methyl methacrylate as a copolymerization component, swelling the seed particles 20 to 80 times the size of the original seed particles by mass using a swelling solution comprising an oil-soluble polymerization initiator and a monomer mixture containing 70% by mass or more of methyl methacrylate and 3 to 8% by mass of divinylbenzene, and polymerizing the monomers.

2. A method for producing colored monodispersed particles which comprises preparing, as seed particles, poly(methyl methacrylate) particles or acrylic resin particles comprising 70% by mass or more of methyl methacrylate as a copolymerization component, swelling the seed particles 20 to 80 times the size of the original seed particles by mass using a swelling solution comprising an oil-soluble polymerization initiator and a monomer mixture containing 70% by mass or more of methyl methacrylate and 3 to 8% by mass of divinylbenzene, polymerizing the monomers, and agglomerating a pigment in the resulting porous monodispersed particles.

3. The method of producing colored monodispersed particles according to claim 2, wherein the pigment is one or more pigments selected from the group consisting of anionic pigments, cationic pigments, and nonionic pigments.

4. The method of producing colored monodispersed particles according to claim 2 or 3, wherein subsequent to pigment agglomeration, the particles are treated using a mechano-chemical process.

5. The method for producing porous monodispersed particles according to claim 1, comprising preparing, as seed particles, poly(methyl methacrylate) particles.

6. The method for producing porous monodispersed particles according to claim 1, comprising preparing, as seed particles, acrylic resin particles comprising 70% by mass or more of methyl methacrylate as a copolymerization component.

7. The method for producing porous monodispersed particles according to claim 1, comprising preparing, as seed particles, acrylic resin particles comprising 90% by mass or more of methyl methacrylate as a copolymerization component.

8. The method for producing porous monodispersed particles according to claim 1, wherein said seed particles have an average particle diameter of 0.5 to 4.5 µm and a weight average molecular weight of 150,000 to 300,000.

9. The method for producing porous monodispersed particles according to claim 1, wherein said swelling solution comprises an oil-soluble polymerization initiator chosen from benzoyl peroxide, lauroyl peroxide, di-t-butyl peroxide, cumene hydroperoxide, and azobisisobutyronitrile.

10. The method for producing colored monodispersed particles according to claim 2, comprising preparing, as seed particles, poly(methyl methacrylate) particles.

11. The method for producing colored monodispersed particles according to claim 2, comprising preparing, as seed particles, acrylic resin particles comprising 70% by mass or more of methyl methacrylate as a copolymerization component.

12. The method for producing colored monodispersed particles according to claim 2, comprising preparing, as seed particles, acrylic resin particles comprising 90% by mass or more of methyl methacrylate as a copolymerization component.

13. The method for producing porous monodispersed particles according to claim 2, wherein said seed particles have an average particle diameter of 0.5 to 4.5 μm and a weight average molecular weight of 150,000 to 300,000.

14. The method for producing porous monodispersed particles according to claim 2, wherein said swelling solution comprises an oil-soluble polymerization initiator chosen from benzoyl peroxide, lauroyl peroxide, di-t-butyl peroxide, cumene hydroperoxide, and azobisisobutyronitrile.

* * * * *